DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 28, 1970

876 O.G. 816

T876,008
LIGHT-SENSITIVE PRINTOUT SYSTEM

Frederick J. Rauner, Kodak Park Works,
Rochester, N.Y. 14650

Filed Jan. 28, 1970, Ser. No. 6,543
Int. Cl. G03c *1/52*
U.S. Cl. 96—91
No Drawing. 8 Pages Specification

Diazonium salts of N-methyl-N-phenyl-N′-(4-diazobenzylidene)hydrazone and a 4-(4′-diazophenyl)-2,6-diphenyl pyrylium salt are decomposed by visible light up to 600 mμ. They can be incorporated light-sensitive diazotype compositions and photographic elements which are sensitive to visible light rays up to 600 mμ.